United States Patent Office 3,379,674
Patented Apr. 23, 1968

3,379,674
OPALESCENT VINYL COMPOSITIONS
John E. Jakob, Cranford, Robert P. Conger, Park Ridge, and Leon B. Palmer, Little Falls, N.J., assignors to Congoleum-Nairn Inc., Kearny, N.J., a corporation of New York
No Drawing. Filed July 28, 1964, Ser. No. 385,757
18 Claims. (Cl. 260—41)

ABSTRACT OF THE DISCLOSURE

This invention relates to a thermoplastic vinyl chloride polymer composition having a marked pearlescent appearance containing as the sole filler a talc of defined properties, to a process for preparing such a composition by calendering into a sheet between heated rolls and to the utilization of such sheet by converting it into granules and molding the granules together into a second sheet.

This invention relates to resinous compositions and particularly to such compositions having an opalescent appearance, to processes for producing such compositions, and to processes for utilizing such compositions to form decorative surface coverings.

Resinous composition surface coverings comprising synthetic resinous binder, stabilizers, plasticizers, fillers and color pigments have come to be widely used as coverings for floors, walls and the like. These products have excellent wearing properties and resistance to attack by a large range of household chemicals. The most widely used resinous compositions are polymers of vinyl chloride, including copolymers, terpolymers and the like. These polymers have extremely high wear and stain resistance which makes them excellent for use as surface coverings. It is common practice to add fillers to the composition to decrease the overall cost because of the relatively high cost of the polymers. The addition of such fillers in relatively large quantities is detrimental to the physical properties of the composition.

A large range of fillers, such as silica, whiting, talc, clay, pumice and limestone, have been utilized in vinyl polymer compositions. Various criteria are used for selecting the different types of fillers, cost and plasticizer absorption being the most significant. The physical properties of fillers which are the most critically scrutinized are the crystalline shape, particle size, and oil absorption value. The oil absorption value of the resin is critical in that the higher the absorption value, the more plasticizer which will be absorbed by the filler, thereby making less plasticizer available for carrying out the plasticization of the vinyl resin. Plasticizers are generally higher in cost than the resin and only the minimum needed is used. Fillers of low oil absorption are usually used to prevent loss of availability of costly plasticizer. As a general rule, the smaller the particle size of the filler, the greater is the plasticizer absorption.

Composition sheets containing vinyl polymers are prepared by a number of different methods, including calendering, pressing and molding. In a calendering system where the relatively thin composition sheet has to be passed through a number of calender rolls and other operations, the strength of the sheet at the relatively high temperatures necessary for processing is of great importance. Fibrous fillers will greatly increase the hot strength of a vinyl composition above that which can be obtained with the non-fibrous fillers. Additionally, some such fillers give compositions good roll adhesion which is essential to form a good sheet. Fibrous fillers are those which have elongated structures, such as asbestos, wood flour and fibrous talc. It has become almost universal practice to utilize fibrous fillers when forming vinyl compositions into sheets since hot strength and roll adhesion is needed during processing. Typical examples of such compositions are disclosed in U.S. Patent 2,558,378, issued on June 26, 1951, to Robert K. Petry. The desirability of incorporating talc as part of the filler in vinyl polymer compositions is disclosed in U.S. patent application Ser. No. 262,014 filed Mar. 1, 1963, by Robert P. Conger and Leon B. Palmer.

Most of the vinyl polymer composition surface coverings produced commercially simulate natural materials. In the case of floor covering, terrazzo and other types of stone flooring are the most widely simulated. Many attempts have been made to reproduce the opalescent or pearlescent appearance of natural stones. Such results can be accomplished by utilizing guanine or various lead and bismuth salts. These types of pigments are relatively expensive which make their use prohibitive in any large quantities in the mass market products. In addition, the chemical nature of these types of pigments make them difficult to compound in vinyl polymer compositions. Much effort has been directed in this industry to discovering inexpensive methods for producing opalescent effects.

An object of the invention is to produce a vinyl chloride polymer composition having an opalescent or pearlescent appearance of great depth. Another object is to provide such compositions which are economical to produce and are compatible with other vinyl compositions. Another object of the invention is to provide such vinyl chloride compositions having good strength at high processing temperatures. A further object of the invention is to provide a process for producing such compositions and processes for converting the compositions into sheets. Other objects and the advantages of the invention will appear hereinafter.

In accordance with the invention, it has been discovered that pearlescence or opalescence can be obtained in vinyl chloride polymer compositions utilizing a precise quantity and particle size of a non-fibrous talc in the crystalline form of platelets providing the composition is processed in a critical manner. The platy talc has the general formula $3MgO4SiO_2H_2O$ and a Mohr hardness of less than 2. The platelet crystalline structure is such that the length and width are in a ratio of about 1:1 to 2:1 and the thickness is substantially less than both the length and width. The surface area of the particle is more than 2 and less than 16 square meters per gram as determined by the BET-nitrogen method, and preferably between 8 and 12 square meters per gram. All the particles should be less than 100 microns in diameter and the majority of the particles should be less than 30 microns in diameter. Particularly desirable platy talc filler has an average particle size of 12 to 20 microns. Particle diameter of less than 12 microns should be avoided since it results in loss of the desired opalescence. The talc must also contain less than 1% combined calcium because this may change the crystalline structure.

As indicated, the amount of platy talc is critical to the invention. The talc must be present in over 80 parts by weight for each 100 parts of vinyl chloride polymer. The maximum amount of talc which can be utilized is 180 parts per 100 parts of polymer, and preferably 100 to 160 parts. The refractive index of the filler should be less than about 1.58. The addition of other fillers should be avoided. The compositions of this invention have a true pearlescent appearance in depth which increases in intensity as the amount of filler is increased. This invention, therefore, provides a simple and economical method of producing pearlescent effects in vinyl chloride polymer compositions.

The vinyl chloride polymers for use in this invention can either be simple, unmixed homopolymers of vinyl chloride or copolymers, terpolymers or the like, in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of the extraneous comonomer is copolymerized therein. Suitable extraneous comonomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene; isoprene; chloroprene; 2,3-dimethyl-butadiene-1,3; piperylene; divinyl ketone and the like.

The selection of the plasticizer for incorporation into the compositions of the invention is important in determining the strength and flexibility of the product. Typical plasticizers include dibutyl sebacate, dioctyl sebacate, dioctyl adipate, didecyl adipate, dioctyl azelate, triethylene glycol di (2-ethylhexanoate), diethylene glycol dipelargonate, triethylene glycol dicaprylate and the like. Plasticizers of the aromatic type, such as eters of aliphatic alcohols and aromatic acids or aromatic alcohols and aliphatic acids or aromatic alcohols and aromtic acids, including dibutyl phthalate, dicapryl phthalate, dioctyl phthalate, dibutoxyl ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer should preferably have a low vapor pressure at the temperatures required to fuse the resin. A vapor pressure of 2 millimeters of mercury or less at 400° F. is usually considered satisfactory. The amount of plasticizer can vary widely but usually from about 20 to 150 parts per 100 parts of resin is used. The refractive index of the combination of polymer and plasticizer should be from about 1.48 to 1.53, the combination in the upper portion of the range producing the best results.

Minor amounts of stabilizers which are incorporated to reduce the effects of degradation by light and heat are usually present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of silver, calcium, cadmium, magnesium, cerium, sodium, strontium and the like, glycerine, leucine, alanine, o- and p-amine benzoic and sulfanilic acids, hexamethylene tetramine, weak acid radicals including oleates, recinoleates, abietates, salicylates and the like. Normally, the composition contains from 0.5 to 5 parts stabilizer per 100 parts resin.

In order to produce a sheet in accordance with this invention it is essential that the surface of the sheet remain smooth after formation. Most talc formulations cause the sheet to firmly adhere to calender rolls requiring a substantial force to remove the sheet from the rolls. This can result in roughening the surface of the sheet with loss of the opalescent effect obtained by this invention. This adherence to calender rolls can be overcome by incorporating in the composition a lubricant such as commonly used in vinyl polymer compositions to obtain release from hot molding plates. The most common lubricant of this nature is stearic acid, but other types of lubricants can be used. Typical of such lubricants are waxy solutions of synthetic or natural origin such as carnauba wax, cottonseed wax, mouton wax, candelilla wax, flax wax, seaweed wax, beeswax, spermaceti, paraffin wax, polymerized olefins and the like. As an alternate method the lubricant can be applied to the calender rolls to prevent firm adherence. Utilizing this system, the lubricant can be of the oil types as, for example, silicone oil.

The vinyl chloride polymer compositions are conventionally prepared by blending the polymer, plasticizer, filler, pigments and stabilizer together at temperatures substantially above the softening point of the resin which is usually between 275° F. and 375° F. This mixing operation is conventionally carried out in a Banbury mixer. The amount of mixing should be limited to prevent fragmentation of the filler. The mixed composition is then sheeted by passing between calender rolls usually maintained below the mixing temperature with a temperature of 100° F. lower being typical. It is conventional practice to maintain a temperature differential between the rolls to cause the sheet to adhere or follow one of the rolls. The calendered sheet can be subjected to further calendering to reduce its gauge and smooth its surface or the sheet can be converted into regular or irregular granules which are then mixed with similar granules of contrasting coloration and molded into a sheet. As indicated above, a roll lubricant can be applied to the roll to prevent adherence of the sheet. When using the preferred polyvinyl chloride resin, these operations are carried out at between 170° F. and 325° F. When the sheet is converted into granules, they are preferably within the range of about 0.01 inch to about 1.0 inch in diameter. The thickness of the granules will depend in large part on the thickness desired in the final sheet. As an illustration, a thickness of about 0.01 inch to about 0.024 inch is suitable for consolidation into a sheet about 0.03 inch thick. The invention is particularly useful in forming finished sheets of about 0.010 to about 0.250 inch in thickness.

The granules are formed into a sheet in any desired manner, such as calendering, molding or extruding, following conventional practice. One of the preferred procedures for utilizing the composition of this invention is by forming granules as described above, distributing the granules over the surface of a heated preformed sheet of vinyl composition and then pressing the granules into the preformed sheet. This latter step is usually accomplished by passing between calendar rolls, but other pressing means can be utilized. Utilizing rolls has the desirable effect of substantially increasing the pearlescent effect of the granules. This procedure results in a finished sheet which has areas of pearlescence corresponding to the

5 location of the granules. The granules are substantially undistorted in shape because of their resistance to distortion caused by the presence of the talc filler which gives the granules greater hot strength than the base sheet.

The following examples are given for purposes of illustration:

Example 1

A composition having the following formula was prepared by mixing in a Banbury mixer until a temperature of 280° F. was reached and the composition was homogeneous:

|   | Parts |
|---|---|
| Copolymer of vinyl chloride (87%) and vinyl acetate (13%) | 100.0 |
| Stabilizer (Ba-Cd complex) | 2.0 |
| Epoxidized soya bean oil | 4.0 |
| Dioctyl phthalate | 28.0 |
| Glacier talc #325 | 160.0 |
| Pigment | 1.5 |
| Stearic acid | 0.8 |

The Glacier talc #325 is supplied by the Sierra Talc Company, Newark, N.J. The particle size of this talc is below 44 microns with the average below 11 microns and the surface area is 8.1 square meters per gram. The composition was formed into a sheet of 0.125 inch in thickness by passing between three sets of calender rolls heated at progressively decreasing temperatures from 290° F. to 170° F. The gauge of the sheet was reduced from 1½ inch in thickness. The sheet produced, when cut into square tiles of 81 sq. in. surface area, had a striking pearlescent appearance of great depth.

Example 2

A composition having the following formula was prepared by mixing in a Banbury mixer until the temperature reached 280° F. and the composition was homogeneous:

|   | Parts |
|---|---|
| Copolymer of vinyl chloride (87%) and vinyl acetate (13%) | 100.0 |
| Stabilizer (Ba-Cd complex) | 2.0 |
| Epoxidized soya bean oil | 4.0 |
| Dioctyl phthalate | 28.0 |
| Furnace Creek talc | 160.0 |
| Stearic acid | 1.0 |

Furnace Creek talc is supplied by Sierra Talc Company, Newark, N.J. and has a particle size all below 100 microns with the average below 30 microns. The surface area is 3.1 square meters per gram. The composition was sheeted between two sets of calender rolls to form a sheet having a thickness of about 0.020 inch. The calender rolls were heated to about 275° F. The sheet formed had a marked pearlescent appearance of great depth.

Example 3

Following the procedure of Example 2, a sheet of 0.030 inch in thickness was formed from the following composition:

|   | Percent |
|---|---|
| Copolymer of vinyl chloride (87%) and vinyl acetate (13%) | 100.0 |
| Stabilizer (Ba-Cd complex) | 2.0 |
| Epoxidized soya bean oil | 4.0 |
| Dioctyl phthalate | 28.0 |
| Alpine talc #117 | 160.0 |
| Stearic acid | 1.0 |

A sheet having an excellent pearlescent appearance was obtained.

In order to demonstrate the critical nature of the quantity and type of talc, samples were prepared by the procedure of Example 3 with the various amounts and types of talc as indicated in Table I.

6

TABLE I

| Talc | Parts per 100 parts of resin | Appearance of Sheet |
|---|---|---|
| Alpine #117 talc | 50 | Clear. |
|  | 80 | Slight cloudiness. |
|  | 120 | Pearlescent. |
|  | 160 | Marked pearlescence. |
|  | 180 | Do. |
| Mistron Vapor talc [1] | 50 | Translucent. |
|  | 160 | Do. |
| GN talc [2] | 50 | Do. |
|  | 160 | Opaque. |

[1] Mistron vapor talc, supplied by Sierra Talc Company has a particle size all below 6 microns in diameter with average below 2 microns. Surface area is 19 m.²/g.
[2] Particle size all below 40 mesh screen and 77% through a 320 mesh screen. Oil absorption 40 ml./20 g. (Gardner, Coleman method). Fibrous crystalline structure.

Example 4

The sheet formed in Example 3 was broken up into granules of about 0.5 to 0.38 inch in size. A base sheet was prepared by mixing the following ingredients in a Banbury mixer until the composition was homogeneous. This occurred when the temperature of the composition reached 300° F.

|   | Percent |
|---|---|
| Copolymer of vinyl chloride (17%) and vinyl acetate (13%) | 16.0 |
| Stabilizer (Ba-Cd complex) | 0.4 |
| Epoxidized soya bean oil | 0.4 |
| Butyl benzyl phthalate | 7.0 |
| Asbestos (7R) | 13.2 |
| Limestone | 65.0 |
| Pigment | 1.5 |

The composition was formed into a sheet of 0.125 inch in thickness by passing between three sets of calender rolls heated at progressively decreasing temperatures from 290° F. to 170° F. The gauge of the sheet was reduced from 1.5 inch in thickness. Between the first and second set of calender rolls, the granules were distributed on the surface of the sheet to cover approximately 75% of the surface. The resulting sheet appears to have pearlescent pebbles embedded flush with its surface. The pearlescent appearance was enhanced by the calendering.

Example 5

A composition having the following formula was prepared by mixing in a Banbury mixer until the temperature reached 325° F.–330° F. until the composition was homogeneous.

|   | Parts |
|---|---|
| Polyvinyl chloride | 100.00 |
| Dioctyl phthalate | 28.00 |
| Epoxidized soya bean oil | 6.25 |
| Stabilizer (Ba-Cd complex) | 4.00 |
| Alpine talc #117 | 172.00 |
| Stearic acid | 0.50 |

Alpine talc #117 is supplied by H. M. Royal, Inc., Trenton, N.J., and has a particle size all below 100 microns with the average below 30 microns. The surface area is 3.3 square meters per gram. The composition was sheeted between two sets of calender rolls to form a sheet having a thickness of about 0.020 inch. The first set of calender rolls was heated to 330° F. and 300° F., and the second set at 250° F. and 220° F. The sheet formed had a marked pearlescent appearance of great depth.

Any departure from the above description which conforms to the present invention is intended to be included within the scope of the claims.

What is claimed is:
1. A solid sheet of thermoplastic vinyl chloride polymer composition having a marked pearlescent appearance consisting essentially of a homogeneous mixture of stabilized, plasticized vinyl chloride polymer containing at least 60% vinyl chloride and a talc filler having a refractive index of less than about 1.58, said talc having the general formula $3MgO4SiO_2H_2O$, a Mohr hardness of less than 2 and being present in about 80 to 180 parts per 100 parts of polymer comprising particles having a length about one to two times the dimension of the width and a thickness substantially less than the smaller surface dimension, a surface area of at least 3 and less than 16 square meters per gram and a diameter of more than 12 microns and less than 100 microns, the major portion of the particles having a diameter of less than 30 microns.

2. The solid sheet of thermoplastic vinyl chloride polymer composition as defined in claim 1 wherein said composition includes a lubricant.

3. The solid sheet of thermoplastic vinyl chloride polymer composition as defined in claim 1 wherein the surface area of said talc is about 8 to about 12 square meters per gram.

4. The solid sheet of thermoplastic vinyl chloride polymer composition as defined in claim 1 wherein said talc filler present is about 100 to about 160 parts per 100 parts of vinyl chloride polymer.

5. The solid sheet of thermoplastic vinyl chloride polymer composition as defined in claim 1 wherein said talc filler has an average particle size of between about 12 to about 20 microns.

6. The solid sheet of thermoplastic vinyl chloride polymer composition as defined in claim 1 wherein said vinyl chloride polymer is a copolymer of vinyl chloride and vinyl acetate.

7. The solid sheet of thermoplastic vinyl chloride polymer composition as defined in claim 1 wherein said vinyl chloride polymer is a homopolymer.

8. A process for producing a thin, solid sheet of thermoplastic vinyl chloride polymer composition having a marked pearlescent appearance which comprises mixing together while heating a vinyl chloride polymer containing at least 60% vinyl chloride, plasticizer therefor, stabilizer and about 80 to 180 parts per 100 parts of vinyl polymer, of a talc having the general formula

$$3MgO4SiO_2H_2O$$

a refractive index of less than about 1.58 and a Mohr hardness of less than 2 comprising particles having a length about one to two times the dimension of the width and a thickness substantially less than the smaller surface dimension, a surface area of at least 3 and less than 16 square meters per gram and a diameter of more than 12 microns and less than 100 microns, the major portion of the particles having a diameter less than 30 microns, to form a homogeneous mass, subjecting said mass to calendering between heated rolls to form said sheet and thereafter cooling the sheet thus formed.

9. The process of claim 8 wherein a lubricant is added to the composition to prevent adherence of said composition to said calendering rolls.

10. The process of claim 8 wherein said calender rolls are lubricated to prevent adherence of said composition to said rolls.

11. The process of claim 8 wherein the sheet formed by said calendering is converted into granules, the granules thus formed are mixed with similar granules and then the mixture of granules is consolidated into said thin sheet.

12. The process of claim 8 wherein the surface area of said talc is about 8 to about 12 square meters per gram and the talc is present in about 100 to about 160 parts per 100 parts of vinyl chloride polymer.

13. The process of claim 8 wherein said vinyl chloride polymer is a copolymer of vinyl chloride and vinyl acetate.

14. The process of claim 8 wherein said vinyl chloride polymer is a homopolymer.

15. The process of claim 8 wherein said sheet is converted into granules, the granules distributed on the surface of a preformed sheet of vinyl chloride polymer composition and the distributed granules pressed into said preformed sheet to form a substantially smooth surfaced final sheet.

16. The process of claim 15 wherein said granules are pressed into said preformed sheet by passing between calender rolls.

17. The process of claim 15 wherein said vinyl chloride polymer is a copolymer of vinyl chloride and vinyl acetate.

18. The process of claim 15 wherein said vinyl chloride polymer is a homopolymer.

References Cited
UNITED STATES PATENTS

| | | | |
|---|---|---|---|
| 2,558,378 | 6/1951 | Petry | 260—41 |
| 3,087,829 | 4/1963 | Linton | 106—291 |
| 3,157,614 | 11/1964 | Fischer | 260—41 |

FOREIGN PATENTS

| | | |
|---|---|---|
| 541,647 | 5/1957 | Canada. |
| 686,377 | 5/1964 | Canada. |

ALLAN LIEBERMAN, *Primary Examiner.*